United States Patent [19]

Saller et al.

[11] Patent Number: 5,031,996
[45] Date of Patent: Jul. 16, 1991

[54] OPTICAL TRANSMISSION ELEMENT

[75] Inventors: Helmut Saller, Munich; Guenther Weber, Burgkirchen; Gisela Ettenberger, Munich; Heinz Diermeier, Vaterstetten, all of Fed. Rep. of Germany

[73] Assignee: Siemens Aktiengesellschaft, Munich, Fed. Rep. of Germany

[21] Appl. No.: 500,934

[22] Filed: Mar. 29, 1990

[30] Foreign Application Priority Data

Apr. 12, 1989 [DE] Fed. Rep. of Germany ....... 3912023

[51] Int. Cl.$^5$ ............................................... G02B 6/44
[52] U.S. Cl. ............................ 350/96.23; 350/96.29; 350/96.34
[58] Field of Search ................. 350/96.23, 96.29, 96.34

[56] References Cited

U.S. PATENT DOCUMENTS 4,641,916 2/1987 Destrekh et al. ................. 350/96.23
4,660,926 4/1987 Mayr et al. ........................ 350/96.23

FOREIGN PATENT DOCUMENTS 0151743 12/1984 European Pat. Off. .

Primary Examiner—John D. Lee
Assistant Examiner—Stephen W. Barns
Attorney, Agent, or Firm—Hill, Van Santen, Steadman & Simpson

[57] ABSTRACT

An optical transmission element that has an oil-containing filling compound and inside is provided with a two-layer outside sheath. The inside layer of the sheath is composed of a polyolefin and the outside layer is composed of a polyester, particularly of a polycarbonate. The shrinkage and swelling of the inside layer is largely compensated by the hard outside layer and the swelling portion, which usually appear at higher temperature, are kept extremely low.

19 Claims, 1 Drawing Sheet

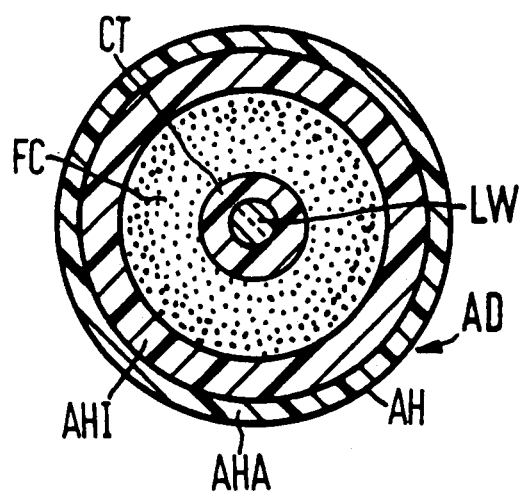

OPTICAL TRANSMISSION ELEMENT

BACKGROUND OF THE INVENTION

The present invention is directed to an optical transmission element comprising at least one light waveguide that is received in the interior of a two-layer outside sheath, wherein a soft, oil-containing compound is provided between the outside sheath and the light waveguide.

U.S. Pat. No. 4,641,916, whose disclosure is incorporated herein by reference thereto, and European Patent Application 0 151 743 disclose optical transmission elements wherein the optical waveguide is introduced in a two-layer outside sheath and there is a soft oil-containing filling compound provided between the outside sheath and the light waveguide. In these disclosures, it proceeds on the presumption that the harmful influence of the oil constituents of the soft filling compound are optimally suppressed to a far-reaching degree in that the material of an inside layer of the two-layer outside sheath is composed of aramides, polyethersulfones or polycarbonates. Although these materials are largely resistant to swelling agents, particularly resistant to hydrocarbon oils of the filling compounds, they have the disadvantage that they are extremely sensitive to stress cracks. In order to counter this disadvantage, a protective layer composed of a polyester, particularly of a polybutylene terephthalate is applied onto the outside of the inside layer, which is composed of either a polyethersulfone or a polycarbonate.

SUMMARY OF THE INVENTION

The object of the present invention is to provide material for the inside layer, which is especially easy to work, is inexpensive and assures a simple processing of the outside sheath given good mechanical properties.

The objects are obtained in an improvement in an optical transmission element comprising at least one light waveguide that is accommodated in the interior of a two-layer outside sheath, wherein a soft, oil-containing filling compound is provided between the outside sheath and the light waveguides. The improvement is that the inside layer or sheath of the two-layer outside sheath is composed of a polyolefin and in that the outside layer or sheath is composed of a polyester, particularly of a polycarbonate.

The shrinkage and/or swelling of the inside layer that is not entirely resistant to the swelling agent and that occurs after the extrusion of the two layers of the outside sheath, is largely compensated by the hard outside layer being composed of a polyester. The swelling force occurring given storage at high temperatures at about 80° C. can be kept low in a simple way by a simultaneous reduction in the modulus of elasticity of the material of the inside layer, wherein the E-modulus value in a range between 500 and 1100 N/mm$^2$ are expedient and the values around 800 N/mm$^2$ have proven especially advantageous. The E-modulus value itself drops, due to the oil absorption in the swelling process anyway and the recited values refer to the ultimate condition. Because polycarbonates are especially stable in terms of their mechanical properties, they have a particular advantage for being used in the outside layer of the sheath.

It is expedient when a swelling of the material of the inside layer, due to a hydrocarbon oil of the filling compound is held below 6 weight percent oil absorption at up to a temperature of 80° C. of heating.

Due to an oil absorption, potential length variations of the inside layer are suppressed as a consequence of the friction between the inside layer of the sheath and the outside layer of the sheath and are merely converted into variations of the inside diameter, which is inconsequential. A longitudinal contraction in an axial direction is largely prevented in the transmission element of the invention. The polyolefin of the inside layer does not become sticky, even over a longer time period so that the mobility of the light waveguides contained in the interior remain largely assured.

The invention and the developments thereof shall be set forth in greater detail with reference to the following description of the preferred embodiments, the claims and drawing.

BRIEF DESCRIPTION OF THE DRAWING

The FIGURE is a cross sectional view through an optical transmission element in accordance with the present invention.

DESCRIPTION OF THE PREFERRED EMBODIMENTS

The principles of the present invention are particularly useful when incorporated in a light waveguide lead AD whose outer protective sheath AH is fashioned in two layers and comprises an outside layer or sheath AHA and an inside layer of sheath AHI. One or more light waveguides LW, which are provided with a protective layer or coating CT, are arranged in the interior of the hollow lead AD. A filling compound FC, which is usually composed of an inorganic thixotropic agent, a hydrocarbon oil, as well as a thickening agent, is disposed in the interior to fill the space between each light waveguide LW and the inner diameter of the inner sheath AHI.

In order, first, to be able to employ a material that is simple to work with and inexpensive, particularly for the inside layer or sheath AHI, and, secondly, in order to keep the disturbing influences of the hydrocarbon oils of the filling compound FC low, the inside sheath AHI is manufactured of a polyolefin. This employment of a polyolefin, such as a polyethylene, which advantageously has an ultra-high molecular weight, i.e. has a mol weight about 1 million, is especially expedient. The density of the material should lie in the range of between 0.94 and 0.96 g/ml. A material sold under the trade name "Lupolen" 5743C by the firm BASF can preferably be utilized for this purpose.

A modified polypropylene can also be advantageously employed for the inside sheath or layer AHI. For example, it can be a copolymer with polyethylene, for example "Hostalen" PPR/PPH, which is provided with an inorganic filler as a blend with the cross-linked polypropylene.

The following expedient specifications also apply to the material for the inside sheath or layer AHI:
  Mean E-modulus in a range of 500–1100 N/mm$^2$ and, preferably, 800 N/mm$^2$;
  Melting point above 100° C.;
  Swelling in hydrocarbon oils below six weight percent oil absorption up to a temperature of 80° C.;
  High melt stability with MFI (melt flow index) at operating temperatures of 10 g/10 min; and Good temperature behavior, for example, no rupture at a temperature of −40° C. given blending with aged fiber dilation of 5%.

Polyesters, preferably polycarbonates, are employed for the material of the outside sheath or layer AHA, whereby the high molecular polybutylene terephthalate can be particularly utilized. What is hereby to be understood by the expression "high-molecular" are materials having a MFI of 10 g/10 min at 250° C./2.16 kp.

A material sold under the trade name "Grilpet" XE3060 by the firm Ems Chemie is suitable in this context. Further, polybutylene terephthalate/polycarbonate blends can be preferably employed, particularly a material known under the trade name "Ultrablend" KR4083 sold by the firm BASF.

The following specifications are expediently desired for the material of the outside sheath AHA:

E-modulus values in a range between 1200 and 2000 $N/mm^2$, preferably above 1500 $N/mm^2$;

Low absorption of hydrocarbon oils, namely below 0.2 weight percent hydrocarbon oils at a temperature of 80° C.;

Low coefficient of thermal expansion, i.e. below $10^{-4}/K$ through a temperature of 80° C.;

Fast and defined crystallization with no re-crystallization at room temperature;

Good light resistance up to 1000 h xenon-arc radiation ISO 4892, no significant modification of the elongation at a tear;

Low water absorption, for example, below one weight percent;

Only an extremely low or no sensitivity to stress cracks in contact with the polyolefin oil and cleaning agents such as terpenes, alcohol and ketones; and Low coefficient of friction below 0.4.

The following values expediently occur for the dimensions of the sheath structure shown in the FIGURE:

Outside diameter of AHA in a range between 1.0 and 8.0 mm;

Inside diameter of AHA in a range between 0.8 and 6.0 mm;

Outside diameter of AHI in a range between 0.8 and 6.0 mm;

Inside diameter of AHI in a range between 0.6 and 5.0 mm; and

Outside diameter of the light waveguide LW in a range between 0.25 and 0.5 mm.

Although various minor modifications may be suggested by those versed in the art, it should be understood that we wish to embody within the scope of the patent granted hereon all such modifications as reasonably and properly come within the scope of our contribution to the art.

We claim:

1. In an optical transmission element comprising at least one light waveguide that is accommodated in the interior of a two-layer outside sheath and has a soft, oil-containing filling compound provided between the light waveguide and sheath, the improvements comprising the inside layer of said two-layer sheath being composed of a polyolefin and the outside layer of the two-layer sheath being composed of a polyester, particularly a polycarbonate.

2. In an optical transmission element according to claim 1, wherein the inside layer has a mean E-modulus in a range between 500 and 1100 $N/mm^2$.

3. In an optical transmission element according to claim 1, wherein the inside layer has a melting point that lies above 100° C.

4. In an optical transmission element according to claim 1, wherein a swelling of the material of the inside layer due to hydrocarbon oil of the filling compound at a temperature up to 80° C. is held below 6 weight percent oil absorption from the filling compound.

5. In an optical transmission element according to claim 1, wherein the material of the inside layer of the sheath has a high melt flow index.

6. In an optical transmission element according to claim 1, wherein the material of the inside layer provides no rupturing at a temperature of −40° C.

7. In an optical transmission element according to claim 1, wherein the inside layer is a polyethylene.

8. In an optical transmission element according to claim 7, wherein the polyethylene of the inside layer is an ultra-high molecular polyethylene having a mol weight greater than 1 million.

9. In an optical transmission element according to claim 7, wherein the polyethylene has a high density in a range between 0.94 and 0.96 g/ml.

10. In an optical transmission element according to claim 1, wherein the inside layer is formed of a modified polypropylene, which is a copolymer with polyethylene.

11. In an optical transmission element according to claim 1, wherein the outside layer is a polybutylene terephthalate.

12. In an optical transmission element according to claim 1, wherein the material of the outside layer is a high-molecular weight polybutylene terephthalate/polycarbonate blend.

13. In an optical transmission element according to claim 1, wherein the material of the outside layer has an E-modulus value in a range between 1200 and 2000 $N/mm^2$.

14. In an optical transmission element according to claim 13, wherein the E-modulus value of the outside layer is greater than 1500 $N/mm^2$.

15. In an optical transmission element according to claim 1, wherein the outside layer absorbs less than 0.2 weight percent hydrocarbon oils at up to a temperature of 80° C.

16. In an optical transmission element according to claim 1, wherein the outside layer has a thermal expansion below $10^{-4}/K$ up to a temperature of 80° C.

17. In an optical transmission element according to claim 1, wherein the inside layer has an E-modulus between 500 and 1100 $N/mm^2$, has a melting point that lies above 100° C., is of a material with a swelling due to hydrocarbon oil of the filling compound at a temperature of up to 80° C. that lies below 6 weight percent oil absorption from the filling compound; said material of the inside layer having a high flow index, and provides no rupturing down to a temperature of −40° C.

18. In an optical transmission element according to claim 17, wherein the material of the inside layer is an ultra-high molecular polyethylene having a mol weight greater than 100 million, and a density in a range of 0.94–0.96 g/ml.

19. In an optical transmission element according to claim 17, wherein the outside layer is a material having an E-modulus value between 1200 and 2000 $N/mm^2$, said material absorbing less than 0.2 weight percent hydrocarbon oils of the filing compound up to a temperature of 80° C. and having a thermal expansion below $10^{-4}/K$ up to a temperature of 80° C.

* * * * *